US008418856B2

(12) United States Patent
Bailey

(10) Patent No.: US 8,418,856 B2
(45) Date of Patent: Apr. 16, 2013

(54) VIBRATORY SCREENING APPARATUS

(75) Inventor: Marshall G. Bailey, Aberdeenshire (GB)

(73) Assignee: Axiom Process Ltd., Newcastle upon Tyne (GB)

( * ) Notice: Subject to any disclaimer, the term of this patent is extended or adjusted under 35 U.S.C. 154(b) by 212 days.

(21) Appl. No.: 12/670,260

(22) PCT Filed: Jul. 24, 2008

(86) PCT No.: PCT/GB2008/002550
§ 371 (c)(1),
(2), (4) Date: Apr. 28, 2010

(87) PCT Pub. No.: WO2009/013511
PCT Pub. Date: Jan. 29, 2009

(65) Prior Publication Data
US 2010/0282648 A1    Nov. 11, 2010

(30) Foreign Application Priority Data

Jul. 24, 2007 (GB) .................................. 0714391.0

(51) Int. Cl.
*B07B 1/28* (2006.01)
(52) U.S. Cl.
USPC ........... 209/268; 209/240; 209/263; 209/308; 209/309; 209/311
(58) Field of Classification Search .................. 209/240, 209/253, 258, 263, 308, 309, 311; 210/330
See application file for complete search history.

(56) References Cited

U.S. PATENT DOCUMENTS

| 3,064,806 | A | * | 11/1962 | Hukki | 209/17 |
| 3,782,547 | A | * | 1/1974 | Dietert | 209/268 |
| 4,190,678 | A | * | 2/1980 | Pleus | 426/478 |
| 4,459,207 | A | * | 7/1984 | Young | 209/269 |
| 6,530,482 | B1 | * | 3/2003 | Wiseman | 209/253 |
| 7,216,767 | B2 | * | 5/2007 | Schulte et al. | 209/309 |
| 7,556,154 | B2 | * | 7/2009 | Astleford et al. | 209/257 |

(Continued)

FOREIGN PATENT DOCUMENTS

| DE | 3300602 A1 | 7/1984 |
| DE | 19516519 C1 | 7/1996 |

*Primary Examiner* — Terrell Matthews
(74) *Attorney, Agent, or Firm* — Gifford, Krass, Sprinkle, Anderson & Citkowski, P.C.

(57) ABSTRACT

The present invention relates to a vibratory screening apparatus which comprises a vibratable screen element (2) mounted in a basket (4), which basket (4) is mounted over a reservoir (6) which contains and holds a pool of liquid slurry (8). A first end (10) of the screen element (2) is disposed within the reservoir (6) such that it is submerged in the body of liquid slurry (8). The reservoir has a deep end (12) in which the first end (10) of the screening element (12) is disposed and a second shallow end (14) above which a median portion (16) of the screening apparatus is disposed. The second end (18) of the screen element (2) is disposed above a portion (20) of the reservoir which extends above the surface of the body of liquid slurry held within the reservoir (6). Vibration means are provided for vibrating the screen element such that oversized solids in the liquid slurry in use of the operation are dewatered on the screen element and are discharged from the second elevated end of the screen element and underside solids pass through the screen element, where they may be collected. A vibratory screening machine is also described.

11 Claims, 4 Drawing Sheets

U.S. PATENT DOCUMENTS

| | | | |
|---|---|---|---|
| 7,571,817 B2 * | 8/2009 | Scott et al. | 209/413 |
| 2006/0144779 A1 | 7/2006 | Bailey | |
| 2007/0108106 A1 * | 5/2007 | Burnett | 209/325 |
| 2007/0131592 A1 * | 6/2007 | Browne et al. | 209/399 |
| 2008/0078699 A1 * | 4/2008 | Carr | 209/233 |

* cited by examiner

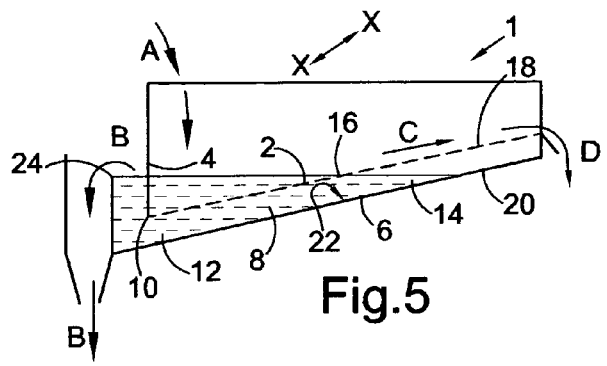
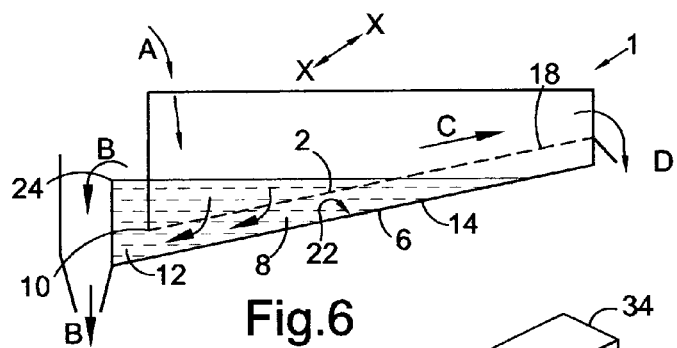
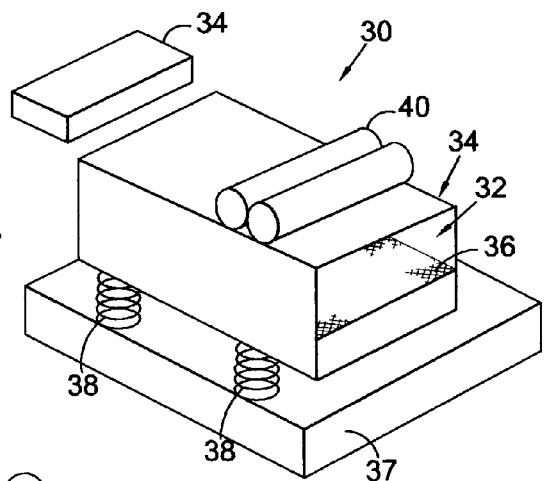
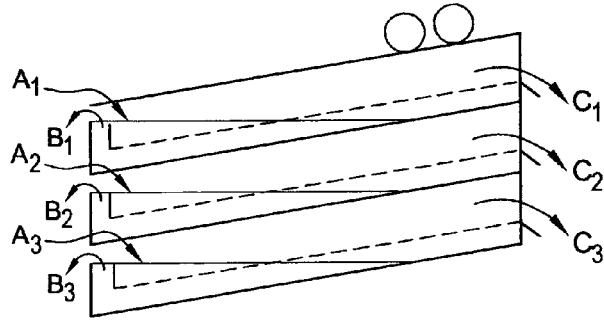

VIBRATORY SCREENING APPARATUS

CROSS-REFERENCE TO RELATED APPLICATIONS

This application is the U.S. national phase of PCT/GB2008/002550 filed Jul. 24, 2008, which claims priority of Great Britain Patent Application No. 0714391.0 filed Jul. 24, 2007.

The present invention relates to an improved vibratory screening apparatus for use in separating solids from fluids in, for example, mineral processing, classification and dewatering.

Screening is used to separate solids according to particle size and or to separate solids from fluids. Solids to be screened may be dry or wet and may often be screened out of a carrying fluid. The process is used in many industries including: mineral and metallurgical processing, quarrying, pharmaceuticals, food and the drilling of oil, water and gas wells. The design of screening equipment varies widely but will generally be of one of two types, either static or moving.

Static screens generally include coarse screens and sieve bends. These are normally mounted at an angle such that solids on the screen roll over it by gravity and in so doing either pass through the screen or roll off it (see the illustrative example shown in FIG. 1, where arrow A indicates a feed of solids; arrow B indicates undersize solids and arrow C indicates oversize solids). Static screens are typically used to screen solids down to 5 mm. Sieve bends may be used to screen finer sizes (see FIG. 2, where arrow A indicates a feed of solids; arrow B indicates undersize solids and arrow C indicates oversize solids).

Moving screens are generally described according to the motion of the screen. Types will typically include: revolving rotary screens, shaking screens, gyratory screens, linear screens and high frequency vibratory screens. Moving screens will normally be comprised of two elements:—the screen panel and the screening machine.

Screen panels are generally mounted in a screening machine in such a manner that they may be removed and replaced either when worn or when a change in separation size is required. Screen panels may be constructed of widely differing materials, including but not limited to, woven wire mesh, wedge wire, moulded plastics, synthetic woven fabrics, drilled plates of either plastic or metal. Screen panels will be made with different hole sizes to provide separation at different sizes.

The screening machine design will vary widely according to the movement that is required to be imparted to the screen panel; the process application; working environment and the process capacity required. The screening machine motion will normally be arranged to impart energy to the screen panel such that; a) solids to be screened are moved in such a manner that encourages them to pass through the screen. These solids are termed 'undersize'; b) solids that are larger than the screen aperture and as such cannot pass through the screen are transported off the screen. These solids are generally termed 'oversize'.

Any fluid discharged from the screen with the oversize solids is generally termed 'screen overflow'. Fluids carrying solids are encouraged to pass through the screen and fluid passing through the screen is generally termed 'screen underflow'.

Moving screens can be used for the screening of either dry or wet solids and or the screening of solids from fluids. Wet screening will normally be the screening of solids from a fluid, which is generally termed a 'slurry', being a mixture of solids and a fluid. Where a slurry is screened to remove the majority of the fluid from the solids, without any specific need to size the solids, the function of the screen is generally termed 'dewatering'. This term is applied to the function of the machine and will apply to slurries that are made of water or any other material. Where a slurry is screened to achieve a specific size split the function of the screen is termed 'classification'.

Conventionally the process of classification is the separation of solids according to size. The feed material is ideally split into the required size fractions with all of the material above screen aperture size reporting to the 'Oversize Fraction' and all of the material below screen aperture size reporting to the screen 'Undersize Fraction'. Poor classification efficiency occurs when undersize solids report to the oversize fraction and/or oversize solids report to the undersize fraction. To achieve high classification efficiency solids require to be presented to the screen face in such a manner that allows them to reach the screen face and to pass through the screen. In conventional equipment the feed slurry is typically fed onto the screen as a thin film and screen motion assists undersize solids to pass through the screen and oversize solids to be conveyed to the oversize discharge. This is shown illustratively in FIG. 3, where arrow A indicates the direction of a feed slurry; arrow B indicates undersize solids and fluid; arrow C indicates oversize solids and arrow D indicates the direction of vibration of the machine. Secondly, the fluid carrying the solids must reach the screen face and pass through the screen. If the fluid fails to pass through the screen and reports to the overflow it will generally carry undersize solids with it, consequently reducing classification efficiency. Thirdly, the screen apertures must remain open to allow solids to pass through the screen. A common problem experienced is screen 'blinding'. This occurs when solids become trapped in the apertures of the screen. When 'blinding' occurs the number of apertures in the screen is reduced, the effective size of the apertures is reduced and the process capacity of the screen is reduced. The performance and often the operating life of a screen suffering 'blinding' will be different from a screen that is not 'blinded'.

In conventional equipment multiple methods of eliminating or reducing blinding are employed. Typically these may include but are not limited to: the use of shaped apertures, wedgewire screen construction, layered wire mesh, screen motion and frequency of screen vibration.

Finally, oversize solids must not be encouraged to form agglomerations or a thick bed of solids on the screen face that contain, trap or act as a filter to trap undersize material. Agglomerations and beds of solids typically form when the solids content of the feed slurry is high and the characteristics of the slurry are such that it dewaters rapidly. Generally it is recognised that once an agglomeration or bed of dewatered or partially dewatered solids is formed, any undersize solids in the agglomeration or bed will be trapped inside the agglomeration and will thereafter report to the oversize fraction. In conventional equipment, to counteract the formation of agglomerations or beds of solids, low slurry feed rates are employed. Additionally fluid sprays may be directed at the screen to break up agglomerations and beds, refluidising the solids into a slurry with the effect that the undersize solid is remobilised such that it may pass through the screen (see FIG. 4, where arrow A indicates a feed slurry; arrow B indicates undersize solid, slurry fluid and excess spray fluid; arrow C indicated oversize solids; arrow D indicates the direction of vibration of the machine; and arrows E indicate the direction of water being sprayed onto the screen). This approach has a number of disadvantages:—fluid is added to the process stream diluting the process stream; the size of the classification screen may be determined by the number of sprays required resulting in low process rates and large equipment; power is required to pressurise the sprays; spray nozzles can become plugged and result in increased maintenance and reduced classification efficiency.

It is an object of the present invention to avoid the problems of conventional processes and to improve the classification performance of wet screening equipment.

The present invention provides a vibratory screening apparatus for use in separating solids from a liquid and solids mixture feed, said apparatus comprising a vibratable screen element mounted over a reservoir suitable for holding a body of liquid slurry, a first end of said screen element being disposed at a level inside said reservoir such that, in use, said first end is submerged in a said body of liquid slurry at one end of said reservoir, with the second end of said screen element being disposed above the other distal end of said reservoir, such that said screening element is inclined to the horizontal with at least a portion thereof being submerged in a said body of liquid slurry; and means formed and arranged for vibrating said screen element such that oversize solids in a liquid slurry, in use of the apparatus, are dewatered on the screen element and are discharged from the second elevated end of screen element and undersize solids pass through the screen element.

Thus, with a vibrating screen apparatus according to the present invention, high efficiency classification is achieved together with improved through-put relative to conventional equipment for a given screen panel area, resulting in a smaller machine size/footprint. Furthermore, reduced screen panel blinding is achieved and the need for fluid sprays and dilution of the process slurry is reduced or eliminated.

Preferably the screen element is mounted at an angle of between 2 to 20°, desirably 5 to 15°, from the horizontal with the lower (first) end receiving a feed slurry. In use, a pool (body) of slurry is formed in the reservoir such that a proportion of the slurry is both above and below the screen element. The proportion of screen element which is immersed in a slurry, in use of the apparatus, would depend on the application to which the vibratory screening apparatus is put but will typically be in the range of from 20% to 80%, desirably 30% to 70%.

Preferably the volume of liquid slurry in the reservoir, and accordingly the depth thereof, is controlled by a weir or discharge aperture or valve means. The rate of feed of slurry to the screen element is controlled such that the required classification efficiency is achieved and will be selected by a person skilled in the art.

What the inventor(s) have realised, for the first time, is that by maintaining the fluid content of the slurry above the screen with a high liquidity, due to the pool of slurry fluid above and below the screen, agglomerations of solids, or a bed of solids, is discouraged from forming on the screen due to the high fluid content of the pool of slurry.

The reservoir may be of any suitable shape and configuration but preferably the reservoir has a deep end, in which the first end of the screening element is disposed and a shallow end between said first and second ends of the screening element, together with an exposed end above which sits said second end of said screen element. The reservoir could be equal in depth over its entire length but such an arrangement is likely to fill with settled solids.

The vibratory action imposed on the screen element acts to agitate the slurry above the screen element thereby keeping solids in the slurry in suspension and allowing them to reach the screen face to be screened and classified. Undersize solids are encouraged to pass through the screen into the body of liquid slurry below the screen and then to be discharged in the liquid slurry through the weir and other discharge means.

Furthermore, the vibratory action imposed on the screening element transports oversize solids out of the pool of slurry above the screen, de-watering them as they pass over the screen in that portion of the screen element that is covered with fluid and discharging oversize solids out at the elevated end of the screen element.

Furthermore, it has been found that the agitation of the whole of the body of slurry in the reservoir which is below the screening element assists in maintaining the under-size solids in suspension within the fluid until the fluid is discharged from the reservoir through the weir or discharge means. This prevents under-size solids which have passed through the screen settling on the base of the reservoir.

An additional advantage of the present invention is that the tendency of the screen element to "blind" is reduced due to the presence of liquids on both sides of the screen element resulting in a reduced velocity profile through the screen.

In another aspect the present invention provides a vibratory screening machine for use in removing solids from a liquid and solids mixture feed, comprising a vibratory screening apparatus according to the first aspect of the present invention; a feed for supplying liquid slurry to said vibratable screen element; a discharge means on said reservoir for discharging fluid slurry that has passed through the screen element and means for discharging said slurry, in use of the machine, from said machine; and means for collecting oversize solids discharged from the second end of said screen element.

Preferably the screen element is mounted in a "basket", said basket being formed and arranged to be vibrated by suitable vibration means. Alternatively, said basket is mounted in said reservoir such that said reservoir and said basket, including said screen element are vibrated by suitable vibration means.

The selection of appropriate vibratory motion so as to impart an upwards direction of motion to over-size solids will be known to those skilled in the art.

Preferably though there is provided a range of vibratory frequencies, desirably a range of vibratory frequencies which is cyclical in nature and being formed and arranged to assist the transport of solids across the screen. Vibratory frequency can be changed from typically between 1000 cycles/minute to 2000 cycles/minute.

An alternative is to use a low vibratory frequency combined with large vibratory amplitudes typically between 100 to 1000 cycles per minute with amplitudes of between 5 mm and 15 mm. Alternatively there may be used high vibratory frequencies combined with small vibratory amplitudes typically in the range of between 1000 to 4000 cycles per minute with amplitudes of between 0.1 mm and 6 mm. Alternatively there may be used a combination of high and low vibratory frequencies and large and small vibratory amplitudes which are cycled so that in use a liquid slurry is subjected to various different combinations of frequencies and vibratory amplitudes thereby improving dewatering and classification and transport of oversize solids on the screen face.

Tests by the applicant have indicated that, in some circumstances and depending on the fluid mix, when fluid is present on both sides of the screen, transport of solids on the screen face is less positive than when fluid is present only above the screen. In practice tests have shown that solids can build up within the pool of liquid above the screen. Accordingly the applicant has identified the requirement to assist solids to move to a section of the screen that is not submerged upon which normal transport of these solids will occur. Mechanisms that can be employed to achieve such functionality comprise one or a combination of the following:—
the use of air injectors under the screen; controlling the feed rate of solids and liquids onto the screen; control of the discharge rate of solids and liquids; cycling the vibratory frequency of the machine; positioning of the feed onto the screen; use of very low vibratory frequencies combined with large vibratory amplitudes; use of very high vibratory frequencies combined with small vibratory amplitudes; mounting of rotary brushes above the screen; air injectors mounted within the pool of liquid; raising and lowering, cyclically, the basket into the liquid reservoir; raising and lowering the end or ends of the basket; the use of baffles above the screen; the use of baffles below the screen; and the mounting of baffles above and below the screen.

In some applications it may be necessary for the machine and apparatus according to the present invention to have a small installation size (footprint) while still necessitating a high process rate. In such an arrangement there may be used multiple screen elements arranged in decks, each deck being fed with liquid slurry independently and run in parallel.

BRIEF DESCRIPTION OF THE DRAWINGS

Further preferred features and advantages of the present invention will appear from the following detailed description given by way of example of preferred embodiments illustrated with reference to the accompanying drawings in which:—

FIG. 5 is a schematic side view of a first embodiment of screening apparatus;

FIG. 6 is a schematic side view of a second embodiment of screening apparatus;

FIG. 7 is a perspective schematic view of a screening machine of the present invention;

FIG. 8 shows a stack of screening apparatus; and

Figure 1:
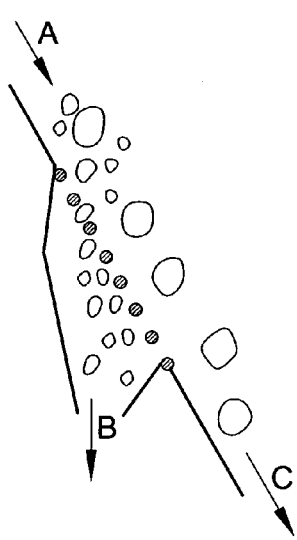
FIG. 1 is a prior art view of a screening apparatus.
Figure 2:
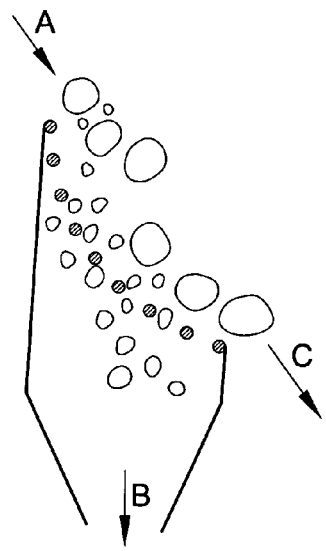
FIG. 2 is a prior art view of a screening apparatus.
Figure 3:
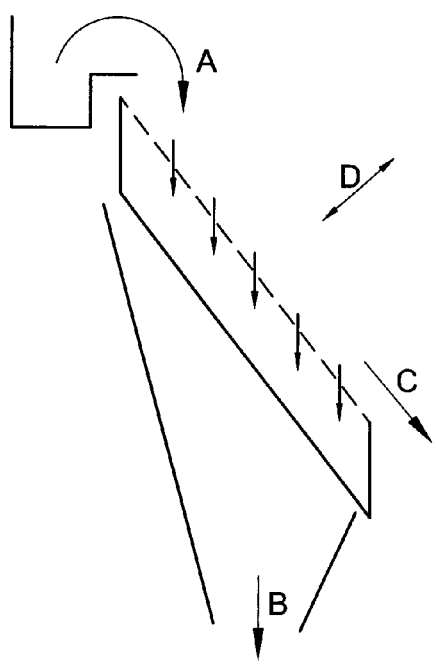
FIG. 3 is a prior art view of a screening apparatus with undersize solids passing through the screen and oversize solids being conveyed to an oversize discharge.
Figure 4:
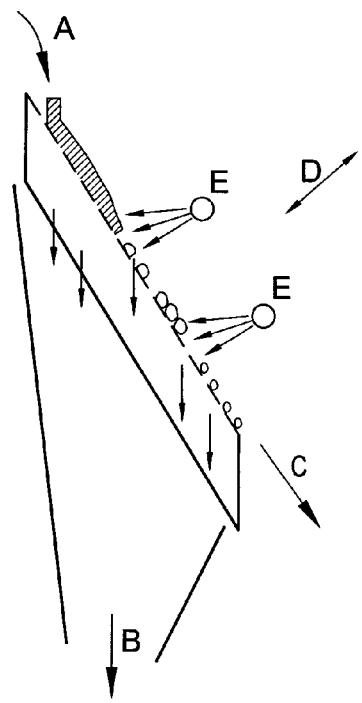
FIG. 4 is a prior art view of a screening apparatus with fluid sprays being directed at the screen to break up agglomerations and beds.

A vibratory screening apparatus, generally indicated by reference number (1), is shown schematically in FIG. 5. The apparatus (1) comprises a vibratable screen element (2) mounted in a basket (4), which basket (4) is mounted over a reservoir (6) which contains and holds a pool of slurry liquid (8). A first end of (10) of the screen element is disposed within the reservoir such that it is submerged in the body of liquid slurry. The reservoir has a deep end (12) in which the first end (10) of the screening element (2) is disposed and a second shallow end (14) above which a median portion (16) of the screening apparatus is disposed. The second end (18) of the screen element (2) is disposed above a portion (20) of the reservoir which extends above the surface of the body of liquid slurry held within the reservoir (6). The screen element (2) is generally parallel to, and spaced apart from, the inclined base (22) of the reservoir and is inclined to the horizontal at an angle of approximately 10°.

In this arrangement liquid slurry to be classified and de-watered is fed (arrow A) into the basket (4) which is mounted to the reservoir (6) and the reservoir and the basket are vibrated by vibrating means (not shown). The vibratory action of the vibration means agitates the slurry above the screen keeping all solids in suspension and allowing all solid sizes to reach the screen face. Solids which are under-sized in the suspension are free to pass through the screen to mix with the fluid slurry below the screen and then to discharge (arrow B) over a weir (24) (controlled by a valve—not shown) at the side (deep end) of the reservoir. The vibratory action (in direction X-X—approximately 45° of the apparatus causes over-size solids to be transported out of the pool of slurry, being de-watered as they pass over the screen element and upwardly (as shown by arrow C) over the surface of the screen element to be discharged (arrow D) as over-sized.

FIG. 6 shows a second embodiment of screening apparatus, generally similar to that described above with reference to FIG. 1, and indicated by similar reference numbers, except that in this arrangement, the reservoir (6) is fixed to the body of the vibratory machine and the basket (4) holding the screen element (2) is vibrated. The vibratory motion of the basket (4) in the pool of slurry held within the reservoir causes the whole pool to be agitated thereby assisting that under-size solids having passed through the screen to be held in suspension in the body of liquid below the screen (4) so as to be discharged out over the weir (24), and not to form agglomerations of solids, or a bed of solids on the base (22) of the reservoir (6).

FIG. 7 shows, schematically, the basic elements of a vibratory screening machine according to the present invention.

The vibratory screening machine, generally indicated by reference number (30), comprises a screening apparatus (32) having a basket (34) and screening element (36). In this arrangement the basket (34), including the reservoir and the screening element are a dynamic component of the machine and are mounted above a machine skid (37) which acts to support the basket (34) and collect fluid processed by the machine. The basket is mounted on springs (38) (or rubber mounts) that allow the basket (34) to vibrate whilst isolating the vibration of the basket (34) from the machine skid (37). Vibration is provided to the basket by a vibratory drive mechanism (40) mounted on top of the basket structure. Liquid slurry (not shown) in the form of a liquid and solids mixture is fed into the basket through a feed aperture (42). Liquid slurry that has been processed through the machine may be collected from the machine skid (37) via a pump (not shown).

FIG. 8 shows, schematically, a number of screens arranged one on top of one another in a stack, each screen is fed (arrows $A_1, A_2, A_3$) separately and the underflow (arrows $B_1, B_2, B_3$) from each screen exits separately as does oversize solid (arrows $C_1, C_2, C_3$).

FIGS. 9 to 17 show, schematically, various different arrangements that may be employed in the execution of the invention.

Figure 9:
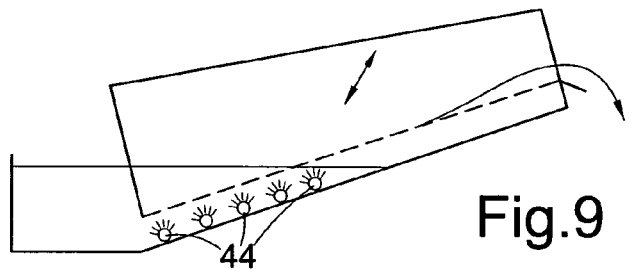
FIGS. 9 to 17 show further alternative arrangements of the invention.

FIG. 9 shows an arrangement wherein there is an air manifold which supplies compressed air to air jets (44) which inject air into the pool of liquid under the screen such that air rises through the screen and assists the transport of solids on the screen surface.

Figure 10:
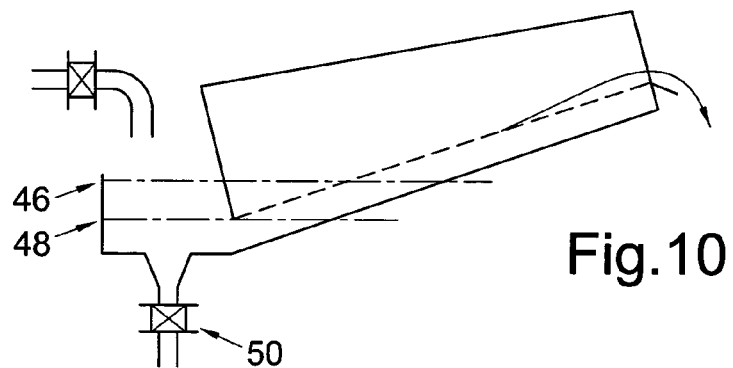

FIG. 10 shows an arrangement whereby the control of the feed rate of solids and liquids to the apparatus is such that the level of the liquid in the reservoir above and below the screen rises (46) and falls (48) in a cyclical manner thereby allowing the screen to carry out its classification when flooded (submersed) and then to clear itself of solids when the fluid level has decreased (48) and the screen is above the level of the liquid.

FIG. 10 also shows an arrangement whereby there is provided a discharge control valve (50) at the base of the reservoir such that the control of the discharge rate of solids and liquids from the reservoir, under the screen, is such, that the level of immersion of the screen in the fluid rises and falls in a cyclic manner thereby allowing the screen to carry out its classification when submersed and then to clear itself of solids when the fluid level falls below the screen.

Figure 11:
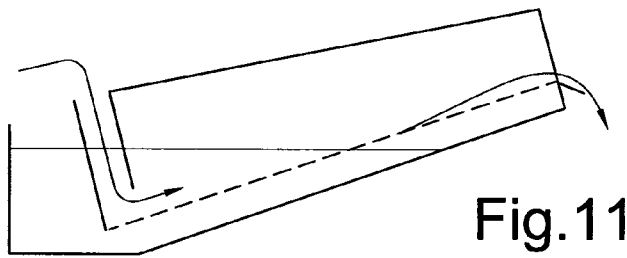

FIG. 11 shows an arrangement whereby the feed to the screen is such that it is introduced above the screen in a manner that allows the flow of the liquid to wash the solids in the pool of liquid above the screen forwards towards the discharge end of the pool thereby improving the transport characteristics of the screen.

Figure 12:
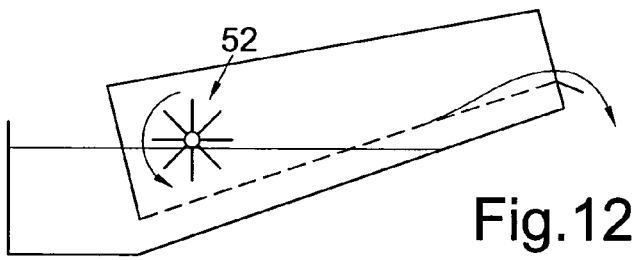

FIG. 12 shows an arrangement where there is mounted above the submersed end of the screen a rotary brush (52) that rotates within the pool of liquid above the screen physically pushing the solids within the reservoir pool towards the discharge end of the reservoir where the transport characteristics of the vibratory screen have improved.

Figure 13:
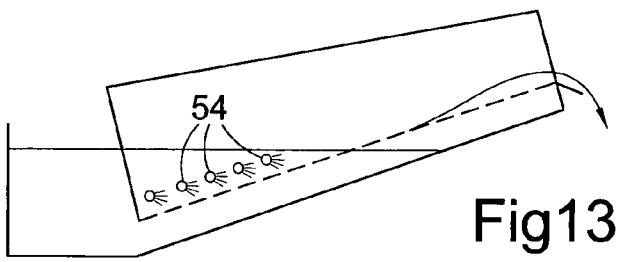

FIG. 13 shows an arrangement where there are provided air jets within the reservoir, the side mounted air jets (54) being directed so as to push solids around within the reservoir, and above the screen, towards the discharge end of the reservoir, where the transport characteristics of the screen are improved.

Figure 14A:
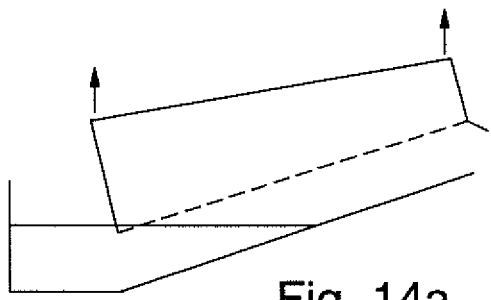
Figure 14B:
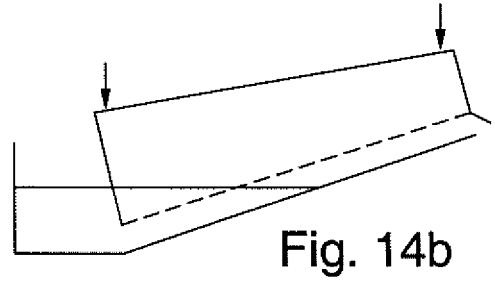

FIGS. 14a) and b) is an arrangement whereby the mounting system of the vibratory basket is such that the basket is lowered cyclically into and out of the fluid reservoir thereby allowing the screen to carry out its classification when flooded (submersed) and then to clear itself of solid when the basked is in a raised position (as shown in FIG. 14a).

Figure 15A:
Figure 15B:
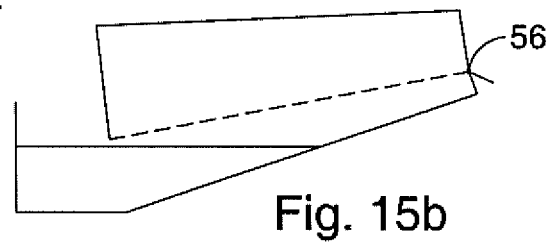

FIGS. 15a) and b) is an arrangement whereby the mounting system for the vibratory basket is arranged such that the first end of the screen may be raised and lowered cyclically while the distal end of the screen is fixed and pivots (56). As the angle of the basket in the reservoir is varied the amount of screen immersed in the body of liquid slurry held in the reservoir will change thereby allowing the screen to carry out its classification when immersed and then to clear itself of solids when the first end of the basket is raised.

Figure 16:
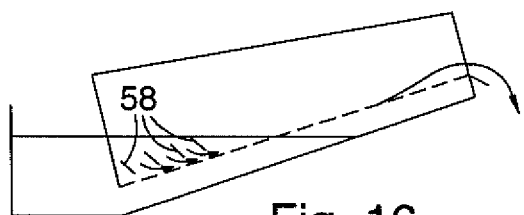

FIG. 16 shows an arrangement where baffles (58) are mounted above the screen such that as the screen vibrates the action of the baffle (which moves with the machine) is to push liquid and solids towards the discharge end of the reservoir and up the screen, such that the transport characteristics of the screen are improved.

Figure 17:
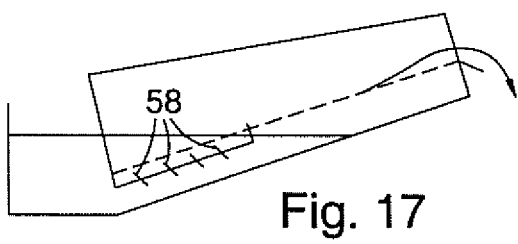

FIG. 17 shows an alternative arrangement wherein there are provided baffles (58) underneath the screen such that as the screen vibrates the action of the baffle is to push liquids and solids towards the discharge end of the screen, again thereby improving the transport characteristics of the screen.

Alternatively there may be provided baffles above and below the screen.

Various modifications may be made to the above described embodiments without departing from the scope of the present invention. Thus for example the rate at which liquid slurry is fed into the basket may be varied according to the operational requirements and the degree of classification and/or de-watering required.

The invention claimed is:

1. A vibratory screening apparatus for use in separating solids from a liquid and solids mixture feed, said apparatus comprising a vibratable screen element mounted over a reservoir suitable for holding a body of liquid slurry, a first end of said screen element being disposed at a level inside said reservoir such that, in use, said first end is submerged in a said body of liquid slurry at one end of said reservoir, with the second end of said screen element being disposed above the other distal end of said reservoir, such that said screening element is inclined to the horizontal with at least a portion thereof being submerged in a said body of liquid slurry; and means formed and arranged for vibrating said screen element such that oversize solids in a liquid slurry, in use of the apparatus, are dewatered on the screen element and are discharged from the second elevated end of screen element and undersize solids pass through the screen element;
   wherein the vibratable screen element is mounted in a basket and vibrated by vibration means acting on the basket and either:
   the mounting system of the basket is provided with means for lowering the basket cyclically into and out of the fluid reservoir;
   or:
   the mounting system of the basket is provided with means for raising and lowering cyclically the first end of the screen while the distal end of the screen is fixed and pivots;
   thereby allowing the screen element to carry out its separation of solids when submerged and then to clear itself of oversize solids when the basket is in a raised position or when the first end of the basket is raised.

2. A vibratory screening apparatus as claimed in claim 1 wherein said basket is mounted in said reservoir such that said reservoir and said basket, including said screen element are vibrated by the suitable vibration means.

3. A vibratory screening apparatus as claimed in claim 1 wherein there is provided multiple screen elements arranged in decks, each deck being fed with liquid slurry independently and run in parallel.

4. A vibratory screening apparatus as claimed in claim 1 wherein there are provided means for injecting air into a said body of liquid slurry adjacent said screen element.

5. A vibratory screening apparatus as claimed in claim 1 provided with means for pushing solids on a first end of the screen element towards the second end of said screen element.

6. A vibratory screening machine for use in removing solids from a liquid and solids mixture feed, comprising a vibratory screening apparatus according to claim 1; a feed for supplying liquid slurry to said vibratable screen element; a discharge means on said reservoir for discharging fluid slurry that has passed through the screen element and means for discharging said slurry, in use of the machine, from said machine; and means for collecting over-size solids discharged from the second end of said screen element.

7. A vibratory screening machine as claimed in claim 6 provided with control means for controlling the rate of feed of a liquid and solids mixture feed to said vibratable screen element.

8. A vibratory screening machine as claimed in claim 6 provided with control means for controlling the discharge rate of solid and liquids from the reservoir under the screen.

9. A vibratory screening machine as claimed in claim 7 wherein said feed control means is formed and arranged to operate in a cyclical manner.

10. A vibratory screening machine as claimed in claim 8 wherein said discharge control means is formed and arranged to operate in a cyclical manner.

11. A method of separating solids from a liquid, the method comprising:
   providing a vibratory screening apparatus according to claim 6; and
   providing a liquid slurry to the feed.

* * * * *